US008051211B2

(12) United States Patent
Finn

(10) Patent No.: US 8,051,211 B2
(45) Date of Patent: Nov. 1, 2011

(54) MULTI-BRIDGE LAN AGGREGATION

(75) Inventor: Norman W. Finn, Livermore, CA (US)

(73) Assignee: Cisco Technology, Inc., San Jose, CA (US)

(*) Notice: Subject to any disclaimer, the term of this patent is extended or adjusted under 35 U.S.C. 154(b) by 2244 days.

(21) Appl. No.: 10/282,438

(22) Filed: Oct. 29, 2002

(65) Prior Publication Data

US 2004/0098501 A1 May 20, 2004

(51) Int. Cl.
*G06F 15/16* (2006.01)
(52) U.S. Cl. .................... 709/249; 709/238; 714/4.12
(58) Field of Classification Search ............... 709/245, 709/246, 249, 238, 220; 714/4.11, 4.12
See application file for complete search history.

(56) References Cited

U.S. PATENT DOCUMENTS

| | | | | |
|---|---|---|---|---|
| 6,657,951 B1 * | 12/2003 | Carroll et al. | | 370/222 |
| 6,978,308 B2 * | 12/2005 | Boden et al. | | 709/229 |
| 6,996,628 B2 * | 2/2006 | Keane et al. | | 709/238 |
| 7,027,412 B2 * | 4/2006 | Miyamoto et al. | | 370/255 |
| 7,028,333 B2 * | 4/2006 | Tuomenoksa et al. | | 726/3 |
| 7,028,334 B2 * | 4/2006 | Tuomenoksa | | 726/3 |
| 7,028,337 B2 * | 4/2006 | Murakawa | | 726/15 |
| 7,209,435 B1 * | 4/2007 | Kuo et al. | | 370/219 |
| 2003/0048746 A1 * | 3/2003 | Guess et al. | | 370/219 |

OTHER PUBLICATIONS

Hewlett Packard, LAN Aggregation through Switch Meshing, Jun. 1998, pp. 1-11.*
Amendment to Carrier Sense Multiple Access with Collision Detection (CSMA/CD) Access Method and Physical Layer Specifications, IEEE Computer Society, Mar. 30, 2000, pp. 1-173.*
Lan Aggregation Through Switch Meshing, Hewlett Packard, Jun. 1998, pp. 1-12, http://www.hp.com/rnd/library/pdf/techlib_meshing.pdf.
Dynamic LACP Trunking, Hewlett Packard, 2000, pp. 1-6, http://www.hp.com/rnd/support/config_examples/2524_lacp.pdf.
*Software Configuration Guide—Release 5.2, Configuring Fast EtherChannel and Gigabit EtherChannel*, Software Configuration Guide, Cisco Systems, Jun. 27, 2002, pp. 7-1-7-16, http://www.cisco.com/univercd/cc/td/doc/product/lan/cat5000/rel_5_2/config/channel.pdf.
*Software Configuration Guide—Release 5.2, Configuring VLAN Trunks on Fast Ethernet and Gigabit Ethernet Ports*, Cisco Systems, Jun. 27, 2002, pp. 12-1-12-28, http://www.cisco.com/univercd/cc/td/doc/product/lan/cat5000/rel_5_2/config/e_trunk.pdf.
*Amendment to Carrier Sense Multiple Access with Collision Detection (CSMA/CD) Access Method and Physical Layer Specifications—Aggregation of Multiple Link Segments*, LAN MAN Standards Committee of the IEEE Computer Society, Mar. 30, 2000, pp. i-ix and 1-173, IEEE Std 802.3ad-2000.
International Search Report as mailed from the PCT on Aug. 2, 2004 for counterpart WO Application (PCT/US03/34423; Filed Oct. 29, 2003), 3 pages).

* cited by examiner

*Primary Examiner* — Kevin Bates
(74) *Attorney, Agent, or Firm* — Campbell Stephenson LLP

(57) ABSTRACT

A method and system for multi-bridge LAN aggregation is disclosed. The method includes aggregating a plurality of LANs coupling a host to a first and a second intermediate network device. The system includes an intermediate network device. The intermediate network device includes a multi-bridge engine. The multi-bridge engine includes a tunnel engine coupled to a bridge interconnect port and a first physical port.

32 Claims, 9 Drawing Sheets

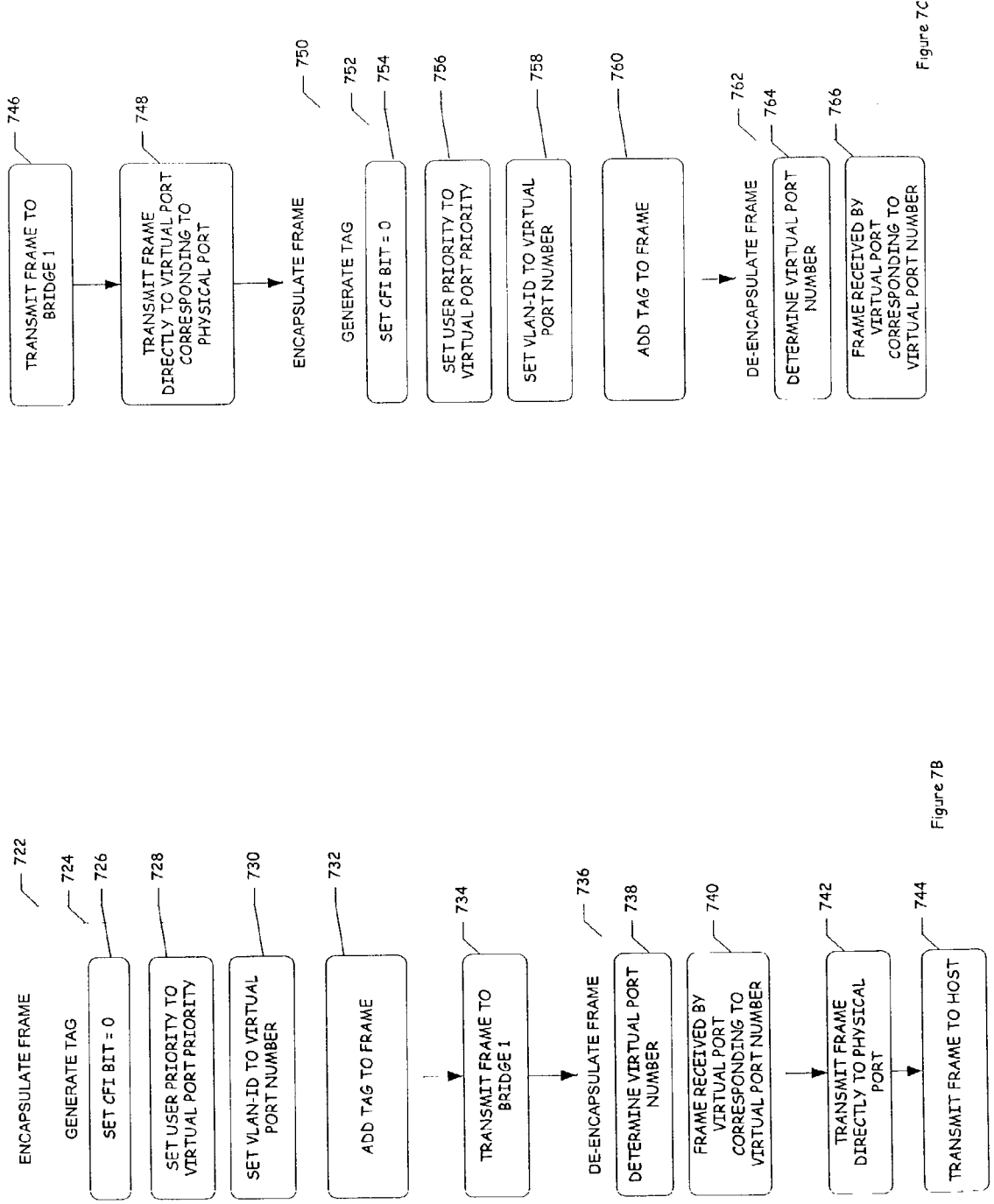

MULTI-BRIDGE LAN AGGREGATION

BACKGROUND OF THE INVENTION

1. Field of the Invention

The present invention relates generally to computer networks and, more specifically, to a multi-bridge LAN aggregated method and system for use in a computer network.

2. Description of the Related Art

Computer Networks

Generally, a computer network is a group of computers (or hosts) coupled to each other in a way that allows information to be exchanged between the computers. A local area network is a common example of a computer network. As its name implies, a LAN is a computer network which is organized within a given geographic area or locale, such as a college campus, a site of a corporation, a single building, etc. Various types of LANs include Ethernet, FDDI, and Token Ring. The LAN type refers to the physical medium and connections over which traffic (i.e., data) is carried using hardware specific to the LAN type. Data on LANs are carried in frames. As used herein, a frame refers to information which is transferred between a host and a bridge and/or between multiple bridges. Each frame includes, at least, a destination link layer address, a source link layer address, a frame type indication, and data. Each frame transmitted to a given LAN can be observed and/or received by every other computer or intermediate network device attached to that LAN.

A number of individual LANs may be coupled together with bridges to create a Bridged LAN. Bridges are intermediate network devices which can be used to interconnect LANs at the link layer to enable computers on one LAN to communicate with the computers of another LAN. Bridges forward frames, as necessary, from one LAN to another, using the destination link layer address of the frames. Bridges learn which LAN Segments to forward the frames on based on the source link layer addresses of the frames. In general, a Bridged LAN can connect many more computers together, and cover a much wider geographical range, than a single LAN. The term "LAN Segment" is often used to refer to a non-bridged LAN (a LAN that includes no bridges). Although a LAN may refer to a computer network organized in a given locale, as used herein, the term "LAN" is used to refer to a physical connection between one or more hosts (e.g., a LAN Segment). Also, as used herein, the term "host" refers to an end-station which is the source of, or destination of, frames transmitted over a network.

A router is an intermediate network device which also interconnects a number of LANs and/or other types of transmission media. For example, a router may be used to connect one Ethernet LAN (or Bridged LAN) to another, or to connect a FDDI LAN to a digital satellite link. Routers generally forward packets, which are essentially data coupled with header information which describes properties of the packet such as a source network layer address, a destination network layer address, and a packet length. The router forwards packets from one LAN to another, adding or removing frame information such as link layer addresses, as needed. A router knows which LAN to send the packets on based on information within the packet itself and a configuration table accessible by the router which correlates address information to LAN information. The term "switch" is sometimes used for an intermediate network device that combines some or all of the functions of both a router and a bridge.

Often, it is desirable to have redundant physical connections to a computer network (e.g., redundant physical connections to multiple intermediate network devices) to improve availability. Unfortunately, some current methods of providing redundancy are inefficient, limited in use, and create undesirable consequences.

Link Aggregation

FIG. 1 illustrates a host 102 coupled to a LAN 104 via a bridge 106 and LANs 108 and 109. Host 102 includes network interfaces 110 (e.g., S0 and S1), both of the same medium (e.g., Ethernet). Bridge 106 includes ports 114 (e.g., ports A0-A2). As seen in FIG. 1, two LANs are provided from host 102 to bridge 106, LAN 108 from network interface S0 to port A0, and LAN 109 from network interface S1 to port A1. In configuring host 102 and budge 106 in this manner, should one of the LANs 108-109 fail, another LAN is available to transport data.

Unfortunately, a consequence of utilizing multiple network interfaces 110 of host 102 to connect to LAN 104 is an increase in the number of IP addresses which host 102 is associated. This increase results from an internet protocol (IP) address being associated with each network interface of a host. Having multiple IP addresses associated with a single host is disadvantageous for a number of reasons. Initially, confusion results as to which IP addresses should be used to communicate with the host and management of the host is made more difficult. Further, use of multiple IP addresses for a host creates inefficiency due to the time it takes to determine the IP addresses associated with the host, and the space consumed in storing the multiple IP addresses.

Link aggregation (also known as trunking) alleviates some of the problems associated with multiple IP addresses by grouping LANs of the same medium type and speed together to form a link aggregation group, which is treated as a single link with the capacity of all the links combined. Commonly known protocols and software may be used to enable link aggregation on bridge 106 and host 102. For example, Link Aggregation Control Protocol (LACP) is a common link aggregation protocol defined in IEEE Std.802.3-2000, clause 43. Similarly, Port Aggregation Protocol (PAgP) is a well known protocol developed by Cisco Systems, Inc. and useful for dynamically aggregating redundant links connecting two or more devices.

With bridge 106 and host 102 configured for link aggregation, the multiple links between them are seen as one link, and consequently host 102 may be seen from a network as having one IP address, even though multiple interfaces of host 102 may be connected to the network. Additionally, aggregating the multiple links through link aggregation has the advantage of increasing the bandwidth between host 102 and bridge 106 to twice that of what the bandwidth would be without link aggregation. Further if one of the links between host 102 and bridge 106 were to fail, communication would resume on the remaining links. Unfortunately, although link aggregation provides a redundant coupling to bridge 106, no redundancy is provided between LAN 104 and bridge 106. Thus, if bridge 106 were to fail, host 102 would lose communication with LAN 104.

Another method of providing redundant connections between a host and a LAN is to couple a host to multiple bridges with multiple wires. FIG. 2 includes a host 202 coupled to LAN 204 via bridges 206-208 and LANs 210-212. Host 202 includes network interfaces 214 (e.g., S0 and S1). Bridges 206 and 208 includes ports 218 (e.g., ports A0-A1 and B0-B1, respectively). As can be seen from FIG. 2, redundancy is provided from host 202 to LAN 204, accomplished in part by bridges 206 and 208.

The advantages provided by the configuration illustrated in FIG. 2 include the utilization of redundant bridges. If bridge 206 where to fail, host 202 would still be able to communicate with LAN 204, and vice versa if bridge 208 were to fail. However, two IP addresses are associated with host 202, one for each network interface S0 and S1, which introduces the aforementioned disadvantages associated with managing hosts with multiple IP addresses. Link aggregation is not available in such a scenario because link aggregation does not support multi-bridge configurations with a single host. Link aggregation is traditionally only available between two devices (e.g., one bridge and one host). In addition, although two LANs are shown coupled to host 202, the bandwidth of host 202 is not automatically doubled. The use of LANs 210-212 is determined by the host IP address chosen, and thus may be under the control of neither host 102 nor bridges 206-208.

Another traditional implementation of providing redundant physical connections to a network involves stacking multiple bridges together and configuring the multiple bridges to appear as one bridge. In order to accomplish this, however, the bridges must be configured to communicate with each other for sharing and learning network and frame information. Although this configuration may be a reasonable solution for providing redundancy if the bridges are in close proximity to each other (e.g., stacked on top of or next to each other) and the necessary cabling and configuration is provided, it has many pitfalls. If one of the bridges and or cables connecting the bridges were to fail, the network connection would be lost, since the bridges could no longer "learn" from each other (e.g., learning link layer addresses from each other). Additionally, such a configuration is not desirable if the bridges are to be at arms length from each other and independent of each other (i.e., not have to depend on other bridges for learning network and address information).

SUMMARY OF THE INVENTION

In one embodiment of the present invention, a method of multi-bridge LAN aggregation is disclosed. The method includes aggregating a plurality of LANs coupling a host to a first and a second intermediate network device.

In another embodiment of the present invention, a system is disclosed. The system includes an intermediate network device. The intermediate network device includes a multi-bridge engine. The multi-bridge engine includes a tunnel engine coupled to a bridge interconnect port and a first physical port.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings. The use of the same reference number throughout the figures designates a like or similar element.

DETAILED DESCRIPTION OF THE INVENTION

Introduction

Figure 1:
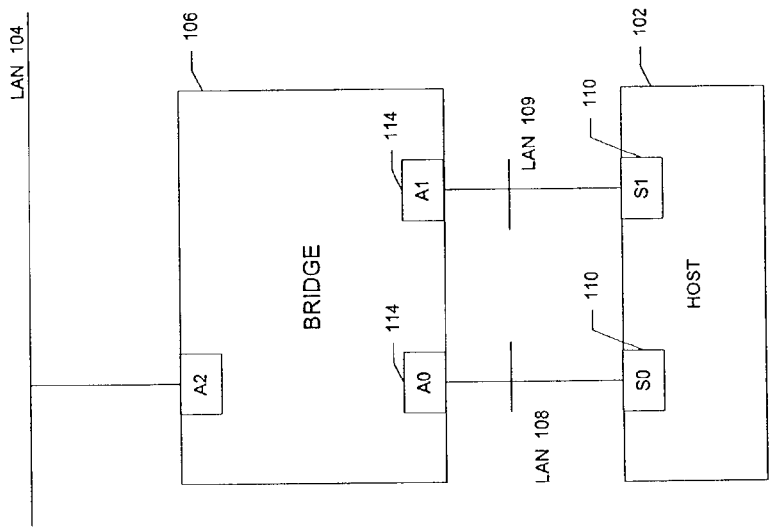
FIG. 1, labeled as prior art, is a block diagram of an implementation of link aggregation.
Figure 2:
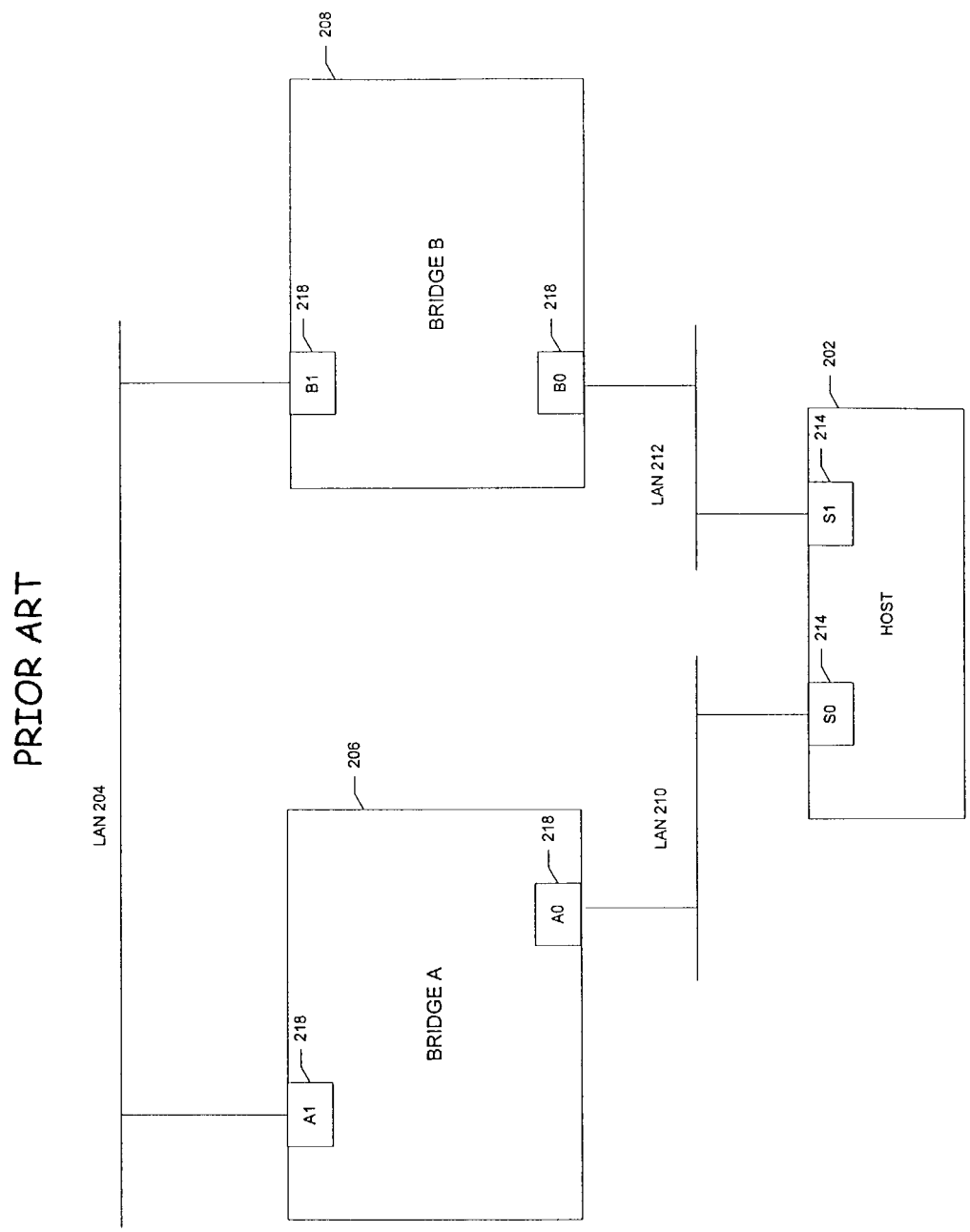
FIG. 2, labeled as prior art, is a block diagram of an exemplary network connection in the absence of link aggregation.

The present invention generally enables link aggregation to be utilized on redundant physical connections between a host and multiple network devices, thus improving reliability and availability of data transmitted to and from the host. As used herein, link aggregation is used to refer to implementations of link aggregation such as IEEE Standard 802.3-2000, clause 43 and Etherchannel. The following is intended to provide a detailed description of an example of the invention and should not be taken to be limiting of the invention itself. Rather, any number of variations may fall within the scope of the invention which is defined in the claims following the description.

Exemplary Network Architecture

FIG. 3 is a block diagram of a computer network 300 including an embodiment of multi-bridge LAN aggregation in accordance with the present invention. Network 300 includes LANs 302-338 interconnected by a number of intermediate network devices, such as bridges 340-344, and routers 346. The intermediate network devices include ports 352 which allow the intermediate network devices to physically connect to one another and to other network devices. As used herein, port refers to a point of attachment to a LAN through which an intermediate network device (e.g., a bridge) transmits and receives data (e.g., media access control frames). Network 300 also includes hosts 354-358 which, in the described embodiment of the present invention, are server computer systems configured to send and receive information on network 300.

It is desirable that a host, host 356 for example, be coupled to network 300 such that if one path connecting host 356 to network 300 were to fail, including the failure of an intermediate device (e.g., bridge 342), an alternate path would be available. Additionally, it is also desirable that such a configuration provide host 356 on network 300 with a single IP address, and also utilize any redundant links coupled to host 356 to increase the bandwidth of information sent to and from host 356. Accordingly, host 356 is coupled to network 300 in a multi-bridge LAN aggregation configuration in accordance with one embodiment of the present invention. Similarly, host 358 is also coupled to network 300 in a multi-bridge LAN aggregation configuration in accordance with one embodiment of the present invention.

Figure 3A:
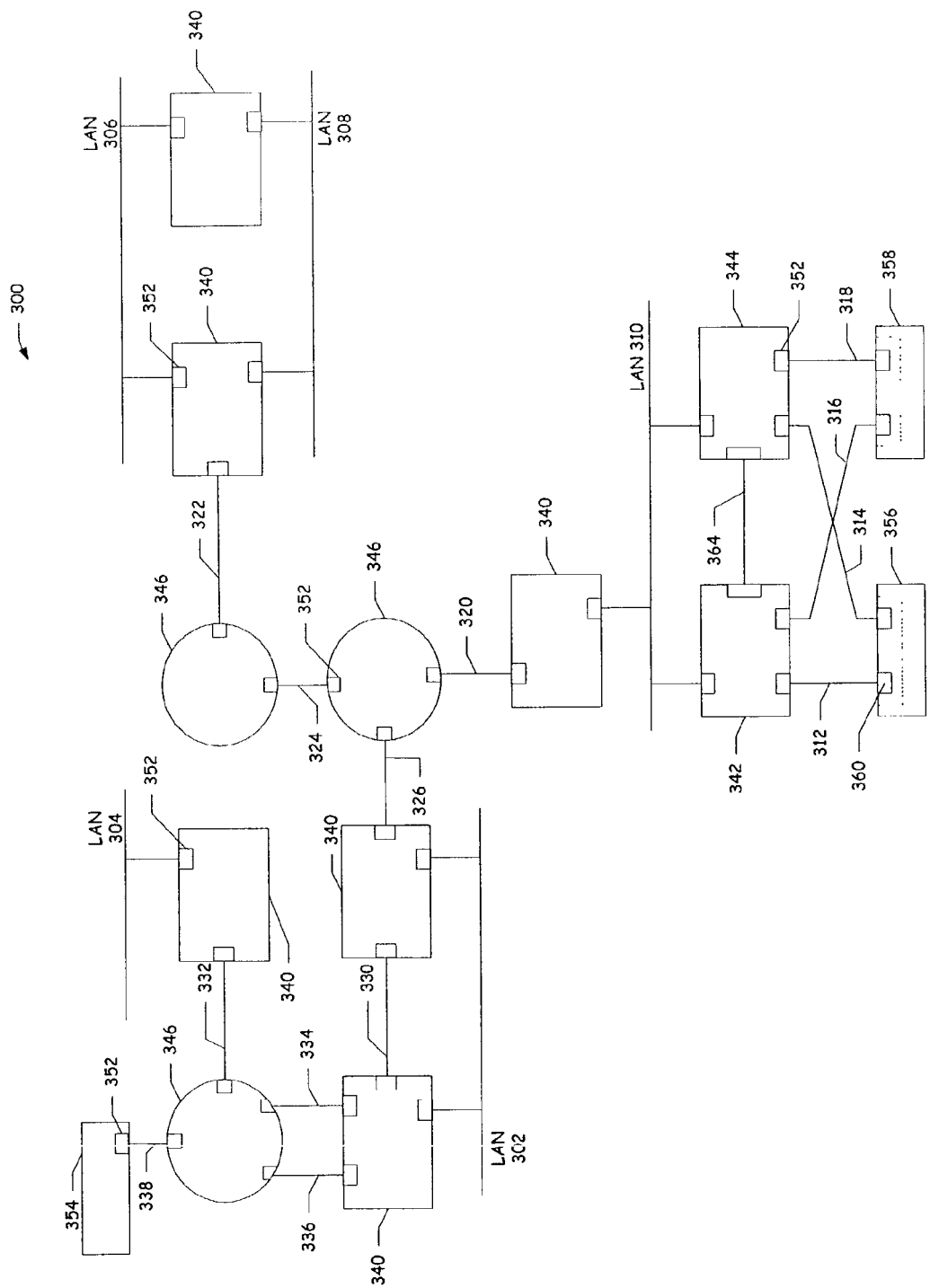
FIGS. 3(A-B) are block diagrams of a computer network including an embodiment of multi-bridge LAN aggregation in accordance with the present invention.

As seen from FIG. 3A, host 356 is coupled to LAN 310 via, at least, LANs 312-314 and bridges 342-344. If bridge 342 and/or LAN 312 were to fail, host 356 would be able to communicate with LAN 310 via LAN 314 and bridge 344. A similar situation would result if bridge 344 and/or LAN 314 were to fail. Additionally, bridge 344 and host 356 are configured for link aggregation, allowing both LAN 312-314 to be simultaneously utilized for transmitting information to and from host 356 and allowing host 356 to be seen from LAN 310 as having a single IP address.

In similar fashion, host 358 is coupled to LAN 310 via, at least, LANs 316-318 and bridges 342-344. If bridge 344 and/or LAN 318 were to fail, host 358 would still be able to communicate with LAN 310 via LAN 316 and bridge 342. A similar situation would result if bridge 342 and/or LAN 316 were to fail. Additionally, bridge 342 and host 358 are configured for link aggregation, allowing both LANs 316-318 to be simultaneously utilized for transmitting information to and from host 358 and allowing host 358 to be seen from LAN 310 as having a single IP address.

It should be understood that network 300 is provided as an exemplary network in which multi-bridge LAN aggregation in accordance with the present invention can be implemented. Other embodiments of the present invention may be implemented in networks other than network 300, and consequently the present invention should not be limited to network 300.

Exemplary Multi-Bridge LAN Aggregation Configuration

Figure 3B:
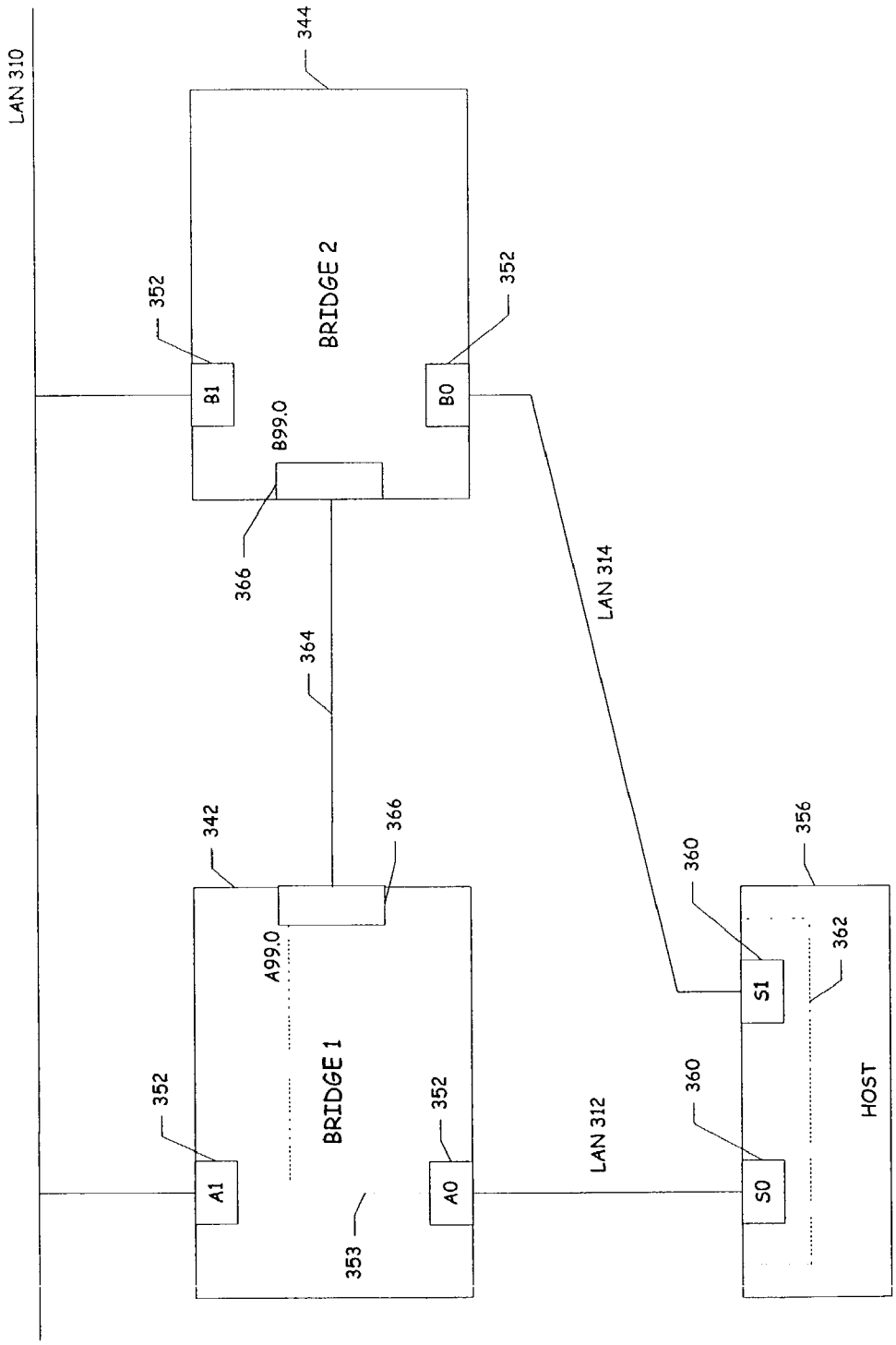

FIG. 3B illustrates a portion of network 300 in closer detail. The portion illustrated is provided only for aiding in the description of the present invention. As illustrated in FIG. 3B, LAN 310 is coupled to intermediate network devices 342 and 344. In one embodiment of the present invention, intermediate network devices 342 and 344 are Layer 2 (or "L2") Ethernet switches. A L2 switch, as is commonly known, is a switch which operates on the data-link layer of the OSI reference model. In the described embodiment, intermediate network devices 342 and 344 are bridges. Bridges 342 and 344 include ports 352 (e.g., ports A0-A1 and ports B0-B1, respectively) and bridge-interconnect ports 366. In the described embodiment, bridge-interconnect port 366 represents a logical port. Many logical ports may be multiplexed over a single physical port (or multiple physical ports, if Link Aggregation is employed). Included in bridge-interconnect ports 366 is sub-port A99.0 which is logically coupled to port A0. Ports 352 allow bridges 342 and 344 to be physically coupled to LANs 310-314. Bridge 342 and 344 are coupled to each other via inter-bridge link 364. In one embodiment of the present invention, inter-bridge link 364 represents one LAN or many LANs Link Aggregated together.

Host 356 is connected to both bridges 342 and 344 through network interfaces 360 (e.g., S0 and S1). Together, network interfaces 360 are configured as one virtual network interface 362 (having one IP address for virtual network interface 362) in accordance with the present invention. In the described embodiment, network interfaces 360 are Ethernet interfaces. In accordance with the present invention, bridge 342 is configured with a pass-through path 353 between port A0 and sub-port A99.0 (a description of how this configuration is accomplished is described in greater detail below). Any frames transmitted to port A0 are sent directly to sub-port A99.0 without any examination by bridge 320. Similarly, any frames transmitted to sub-port A99.0 are sent directly to port A0 without any examination by bridge 320. As used herein, tunneling is used to refer to transmitting a frame without examination. For example, when a bridge receives a frame, it generally examines the frame to determine the corresponding LAN Segment to forward the frame to. Additionally, a bridge will process the frame according to a number of protocols. However, in accordance with the present invention, bridge 342 is configured to internally transmit a frame between bridge inter-connect port 366 and port A0 directly, without such examination. Thus, port A0 on bridge 320 is slaved through sub-port A99.0 to sub-port B99.0 of bridge 344. Bridge 342 is essentially transparent to bridge 344 and host 356.

From the perspective of bridge 344, sub-port B99.0 is treated as a separate interface, and link aggregation is configured on bridge 344 for port B0 and sub-port B99.0. Additionally, from the perspective of host 356, LANs 312 and 314 are "seen" as being directly connected to bridge 344, by virtue of the pas-through path 353. Thus, in the described embodiment, there are two paths between host 356 and LAN 310, with one of the paths transparently traversing bridge 342 (e.g., via pas-through path 353).

Redundancy and Failure Recovery

With the benefits of Link Aggregation, one IP address, represented by virtual network interface 362, is associated with host 356, even though both network interfaces S0 and S1 are coupled to LAN 310. The present invention thus provides the benefit of bridge redundancy and link redundancy between host 356 and LAN 310 with host 356 seen by LAN 310 as having a single IP address via Link Aggregation. If LAN 312 and/or bridge 342 were to fail, link redundancy on host 356 would detect the failure and "shift" all communications to LAN 314 and bridge 344.

In response to the loss of LAN 314 and/or bridge 344, however, bridge 342 would reconfigure port A0 as a "normal" bridge port, discard the use of sub-port A99.0, and also begin executing Link Aggregation (i.e., port A0 would no longer be slaved through sub-port A99.0 to sub-port B99.0 of bridge 344). With the reconfiguration of port A0 as a bridge port, and without pas-through path 353, host 356 (i.e., the link aggregation on host 356) no longer sees LANs 312 and 314 as being directly coupled to bridge 344. Rather, LAN 312 would be seen as coupled to bridge 342, and LAN 314 would be seen as coupled to bridge 344, or not seen at all, depending on the extent of the failure. Host 356 (via a link redundancy protocol such as LACP or PagP) would see this as a re-connection of network interface S0 to another device, and abort the aggregation. Host 356 would then choose either LAN 312 or LAN 314 for its virtual IP interface, according to the usage of the aggregation protocol. A similar reconfiguration would occur if inter-bridge link 364 connecting bridges 342 and 344 were to fail. Because bridges 342 and 344 are able to operate independently from each other (e.g., no "learning" is required between bridges 342 and 344), host 356 can preferably remain in communication with network 310 even if inter-bridge link 364 were to fail.

In addition to the benefits of bridge redundancy and link redundancy between host 356 and LAN 310, the present invention also provides for the advantages of link redundancy in a multi-bridge configuration. In other words, even though host 356 is configured to utilize multiple network interfaces 360 in communicating with LAN 310, host 356 is preferably able to interface with LAN 310 with a single IP address as a result of virtual network interface 362 configured by link aggregation. Being associated with a single IP address provides for easier management of host 356 (and network 300), and eliminates any confusion as to which address IP address should be in communicating with host 356. Further, with link redundancy, the bandwidth between host 356 and LAN 310 is increased (e.g., doubled) since LANs 312 and 314 are able to share the load of the traffic.

Once any failures of bridge 342, bridge 344, LANs 312 and 314, and/or inter-bridge link 364 are corrected, Link Aggregation protocol would resume utilizing both bridges 342 and 344 in accordance with the present invention (e.g., bridge 342 is able to automatically reconfigure port A0 as a pass-through port once a failure on bridge 344, for example, has been corrected.) Although the present embodiment is described as including LANs 312 and 314 for use in link aggregation, it is recognized that any number of LANs (and ports and network interfaces) may be used. Additionally, the LANs may pass through any number of bridges, and in order to increase bandwidth without a corresponding increase in reliability, multiple paths may be tunneled through one bridge.

Exemplary Bridge Architecture

Figure 4:
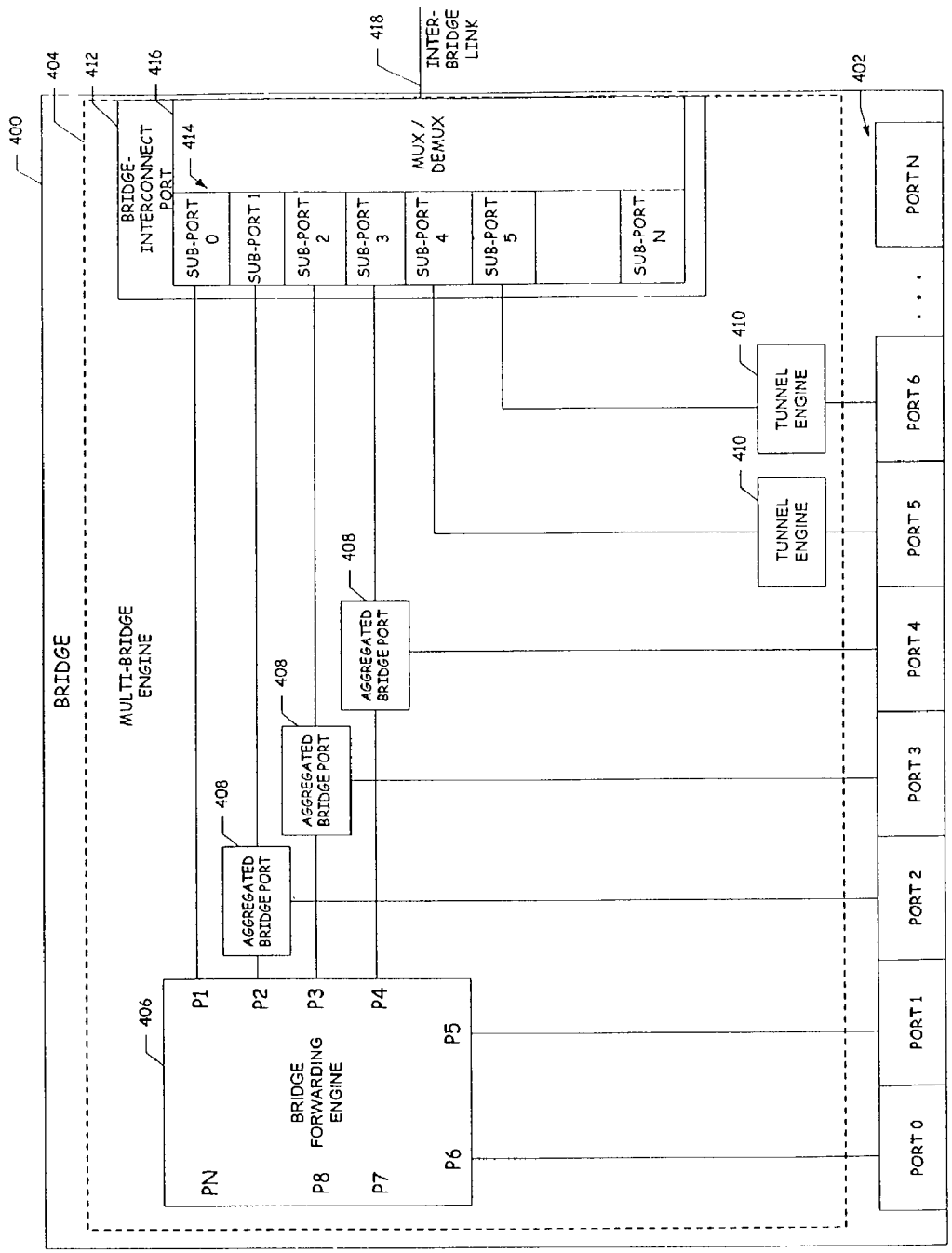
FIG. 4 is a block diagram of a bridge for use in multi-bridge LAN aggregation in accordance with the present invention.

FIG. 4 is a block diagram of a bridge 400 in accordance with one embodiment of the present invention. Bridge 400 includes ports 402 (e.g., port 0-port N) and a multi-bridge engine 404. Multi-bridge engine 404 provides forwarding and pass-through capabilities to bridge 400 which allow data to either be forwarded by bridge 400 (e.g., processing a frame received by bridge 400 according to a number of different protocols) or passed through bridge 400 (e.g., passing a frame through bridge 400 with little or no processing of the frame) in accordance with the present invention.

Multi-bridge engine 404 includes a bridge-forwarding engine 406, aggregated-bridge ports 408, tunnel engines 410, and a bridge-interconnect port 412. It will be recognized that a number of different types of mux/demux technologies may be used in the present invention. For example, Layer 3 tunnels, a number of dedicated Ethernets, and/or an array of ATM emulated LANS. Bridge-forwarding engine 406 receives data on one or more ports (e.g., P1-PN), examines the data according to a number of protocols, and forwards the data out the one or more ports P1-PN. Aggregated bridge ports 408 provide link aggregation support for bridge 400 in accordance with the present invention. Tunnel engines 410 are utilized for transparently passing data through bridge 400 (e.g., tunnel engine 410 may strip of an encapsulated header on a frame passed through bridge 400). It will be recognized that bridge forwarding engine 406, aggregated bridge ports 408, and tunnel engines 410 may be implemented in hardware or software.

Figure 5:
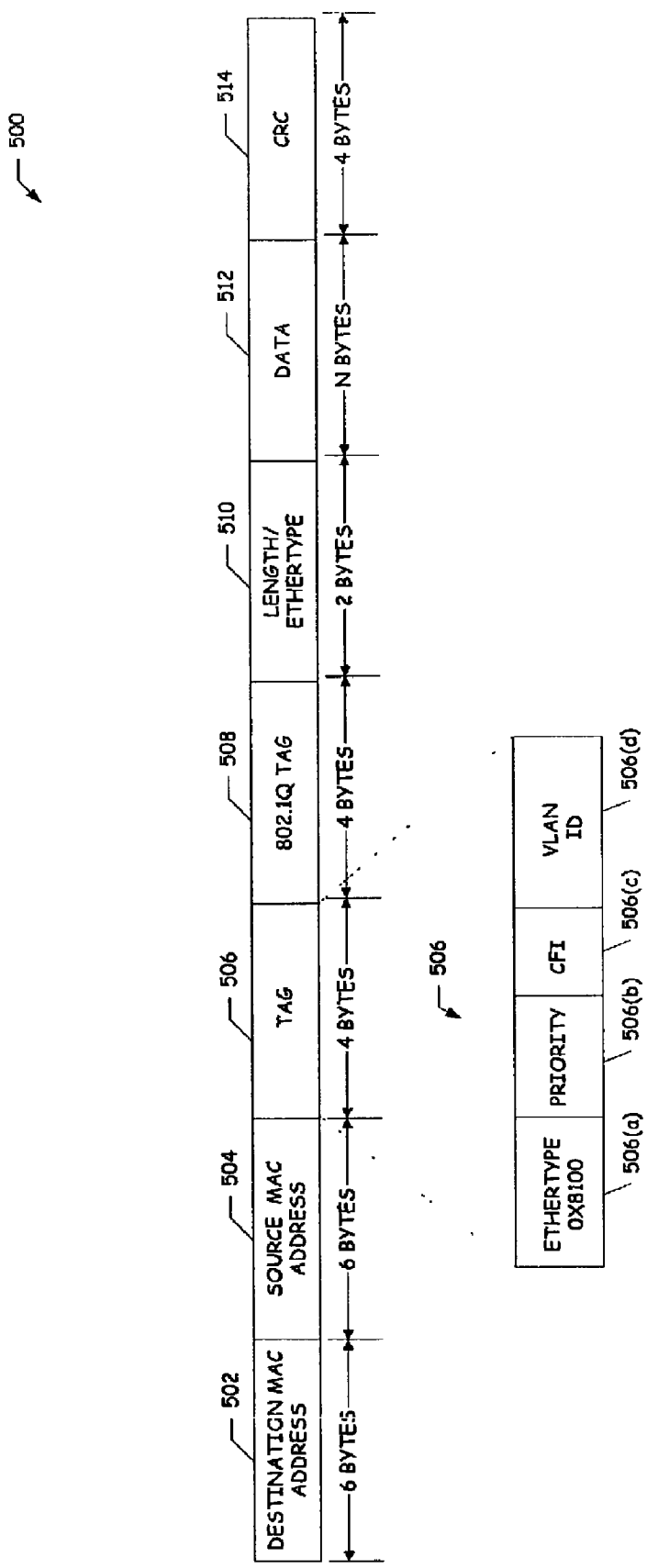
FIG. 5 is a block diagram of an encapsulated unit transmitted in multi-bridge LAN aggregation in accordance with the present invention.

Bridge-interconnect port 412 internally routes data to bridge forwarding engine 406, aggregated bridge ports 408, and/or tunnel engine 410 depending on, for example, information associated with the data (e.g., an encapsulation tag 506 such as that shown in FIG. 5). Additionally, bridge-interconnect port 412 receives data from bridge forwarding engine 406, aggregated bridge ports 408 and/or tunnel engine 410 and adds information to the data (e.g., encapsulates data with an encapsulation tag 506 such as that shown in FIG. 5). Bridge-interconnect port 412 includes sub-ports 414 (e.g., sub-port 0-sub-port N) and multiplexer/de-multiplexer 416. Sub-ports 414 allow data to be transmitted between inter-bridge link 418 and various internal objects of bridge 400 (e.g., bridge forwarding engine 406, aggregated bridge ports 408, tunnel engine 410, and/or ports 402). Multiplexer/de-multiplexer 416 provides encapsulation and de-encapsulation to frames received by bridge-inter-connect port 412. Bridge 400 also includes one or more buffers (not shown) and or memory hierarchies (not shown) to temporarily store frames received on, for example, ports 402 and/or bridge-interconnect port 412.

Bridge 400 is coupled, via inter-bridge link 418, to a bridge 420 (similar to bridge 400, and not shown for simplicity of illustration). Within bridge 400, sub-port 0 is coupled to P1 of bridge forwarding engine 406. P1 represents a LAN linking bridge 400 to bridge 420. A similar configuration is provided in bridge 420. In addition, P1 is utilized to transmit a frame between bridge 400 and 420 at a periodic frequency in order for bridge 400 and 420 to detect a failure in communication (e.g., the loss of inter-bridge link 418) between bridge 400 and bridge 420. For example, in one embodiment of the present invention, bridge 400 is configured, via P1 of bridge forwarding engine 406, to transmit a keep-alive frame to bridge 420. Similarly, bridge 420 is configured to receive the keep-alive frame, and transmit the keep alive frame back to bridge 400. This process is repeated with a frequency of preferably 1 second or less. The loss of three keep-alive frames (either consecutively or within a defined time) results in a reconfiguration of bridges 400 and 420. The home bridge (which is the bridge not configured as the tunneling bridge) will consider the encapsulated link over inter-bridge link 418 as failed. The tunneling bridge will cease pass-through capabilities (but only temporarily, since automatic configuration of pass-through is possible once communication be re-established) and operate with forwarding capabilities.

Each tunneling sub-port of bridge 400 corresponds (is remoted to) an aggregated sub-port on bridge 420. Similarly, each aggregated sub-port on bride 400 corresponds (is remoted to) a tunneling sub-port on bridge 420. For example, sub-ports 1 and 3 of bridge 400 are configured to be remoted by sub-ports of bridge 420. In other words, sub-port 1 (or sub-port 2, or sub-port 3) of bridge 400 is coupled to a sub-port of bridge 420 that is configured to tunnel the frames through bridge 420. Similarly, sub-ports 4 and 5, which are configured on bridge 400 as pass-through ports via tunnel engines 410, are remoted to sub-ports of bridge 420, which, on bridge 420, are configured as aggregated bridge ports.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements of bridge 400). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Encapsulation

FIG. 5 is a block diagram of encapsulated data (e.g., Ethernet frame 500) in accordance with one embodiment of the present invention. In one embodiment of the present invention bridge-interconnect port 412 encapsulates (e.g., includes a tag within, or appended to, frame 500) and de-encapsulates (e.g., examines fields in frame 500 and/or removes tags from frame 500) frame 500 on input buffer logic (IBL) with a multi-bridge tag. It will be recognized that subtle variations of the encapsulation methods described herein may be incorporated with objects other than Ethernet frames. Further, it will be recognized that fields other than those shown in FIG. 5 may be included in, or removed from, frame 500.

In the present embodiment, frame 500 includes destination media access control (mac) address 502 and source mac address 504, representing the address of a destination host and the address of a source host of frame 500. Frame 500 also includes tags 506 and 508, length/Ethertype field 510, data field 512 and cyclical redundancy check (CRC) field 514.

Tag 506 is a multi-bridge tag preferably used to indicate the sub-port number to which frame 500 should be sent. In one embodiment of the present invention, tag 506 is a 4-byte virtual local area network (VLAN) tag as defined in IEEE std 802.1Q-1998. In one embodiment of the present invention, tag 506 includes 2-byte ethertype field 506(a), 3 bit priority field 506(b), 1 bit canonical format indicator (CFI) field 506(c), and 12-bit VLAN-ID field. It is preferable that etherytype field 506(a) be set to 0x8100 and priority field 506(b) be set according to the relative priority of the corresponding sub-port. Additionally, CFI field 506(c) is preferably set to 0 and VLAN-ID field 506(d) field is preferably used to indicate the sub-port of a bridge (e.g., bridge 400) which should transmit/receive frame 500. Although tag 506 is a VLAN tag, it is not necessary for a bridge or host to be VLAN-aware in order to process tag 506. A tag 508, optionally included in frame 500, is also preferably a VLAN tag, however the settings of tag 508 are dependent upon, inter alia, the topology of the virtual local area network.

Alternative Embodiments

Figure 6:
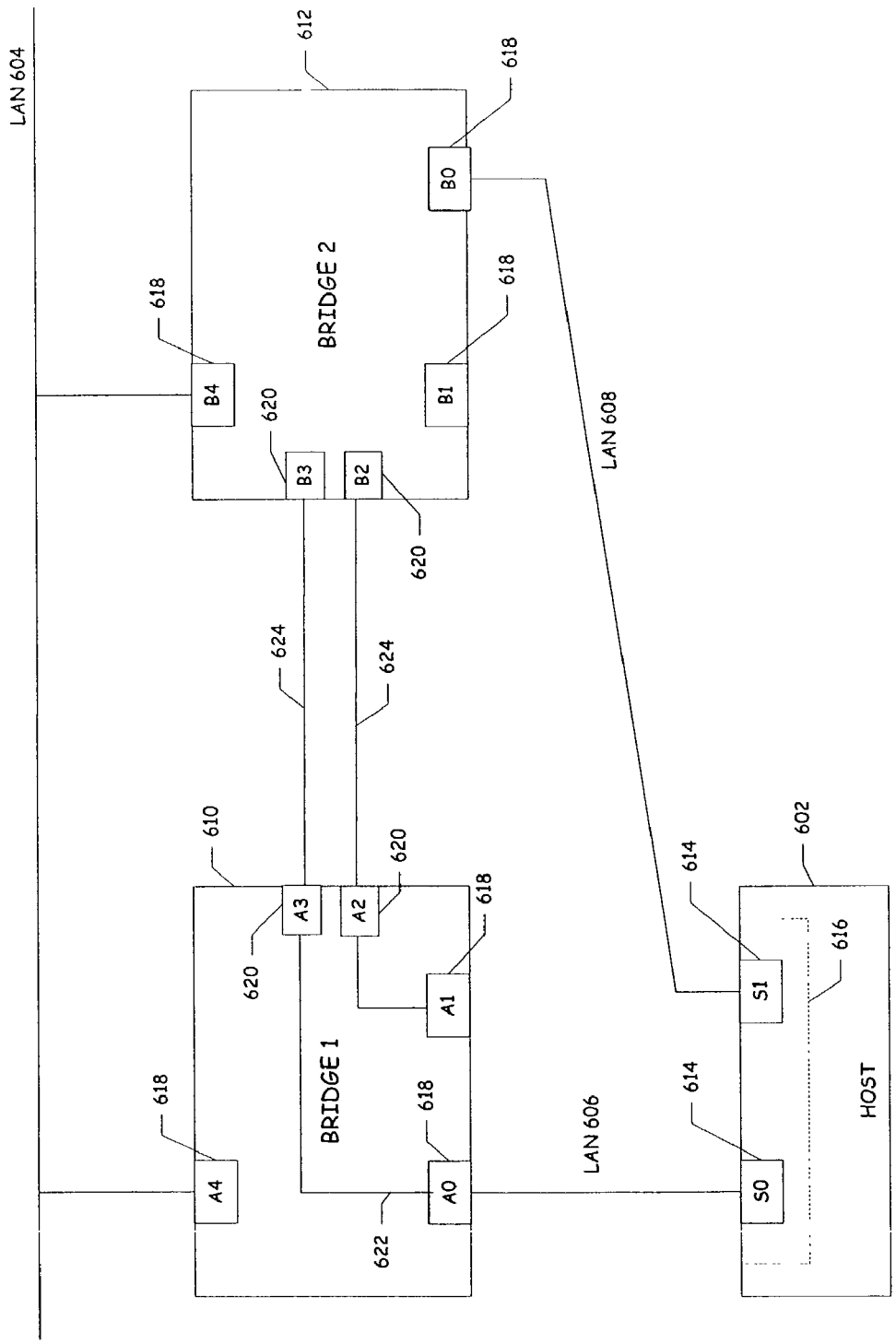
FIG. 6 is a block diagram of another embodiment of a bridge for use in multi-bridge LAN aggregation in accordance with the present invention.

FIG. 6 illustrates another embodiment of the present invention. A host 602 is coupled to a LAN 604 via LANs 606 and 608 and bridges 610 and 612. Host 602 includes a number of (e.g., 2) network interfaces 614. Together, network interfaces 614 are represented as one virtual network interface 616 (having one IP address for virtual network interface 616). Bridge 610 includes ports 618 (e.g., ports A0-A4). Bridge 612 includes ports 618 (e.g., ports B0-B4). A number of (e.g., 2) inter-bridge LANs 624 couple bridge 610 and 612 to each other via bridge ports A2-B2 and A3-B3, respectively.

Port A0 of bridge 610 is tunneled to port A3, and port A1 of bridge 610 is tunneled to port A2. In other words, bridge 610 configures ports A0 and A1 to be slaved to bridge-interconnect ports A2 and A3 and ports B2 and B3, respectively. Bridge 612 and host 602 are to aggregate LANs 606 and 608 and inter-bridge LANs 624. In other words, LANs 606 and 608 and inter-bridge LANS 624 appear as a logical LAN between bridge 612 and host 602, with bridge 610 being transparent to both bridge 612 and 602.

As can be seen from the presently described embodiment of FIG. 6, rather than utilizing, inter alia, one inter-bridge LAN between multiple bridges and a bridge inter-connect port, the embodiment of FIG. 6 provides one physical connection between each port A2, A3 and B2, B3 respectively, and no encapsulation/de-encapsulation is necessary. Such a configuration may be used in a network with few hosts, making it easier to physically connect multiple ports via a number of inter-bridge LANs 624. However, for larger configurations, it is preferable to utilize the embodiment illustrated in FIG. 5, which allows for multiple bridges to be coupled with, at a minimum, one inter-bridge link (although more may be used).

Configuration and Operation

Figure 7A:
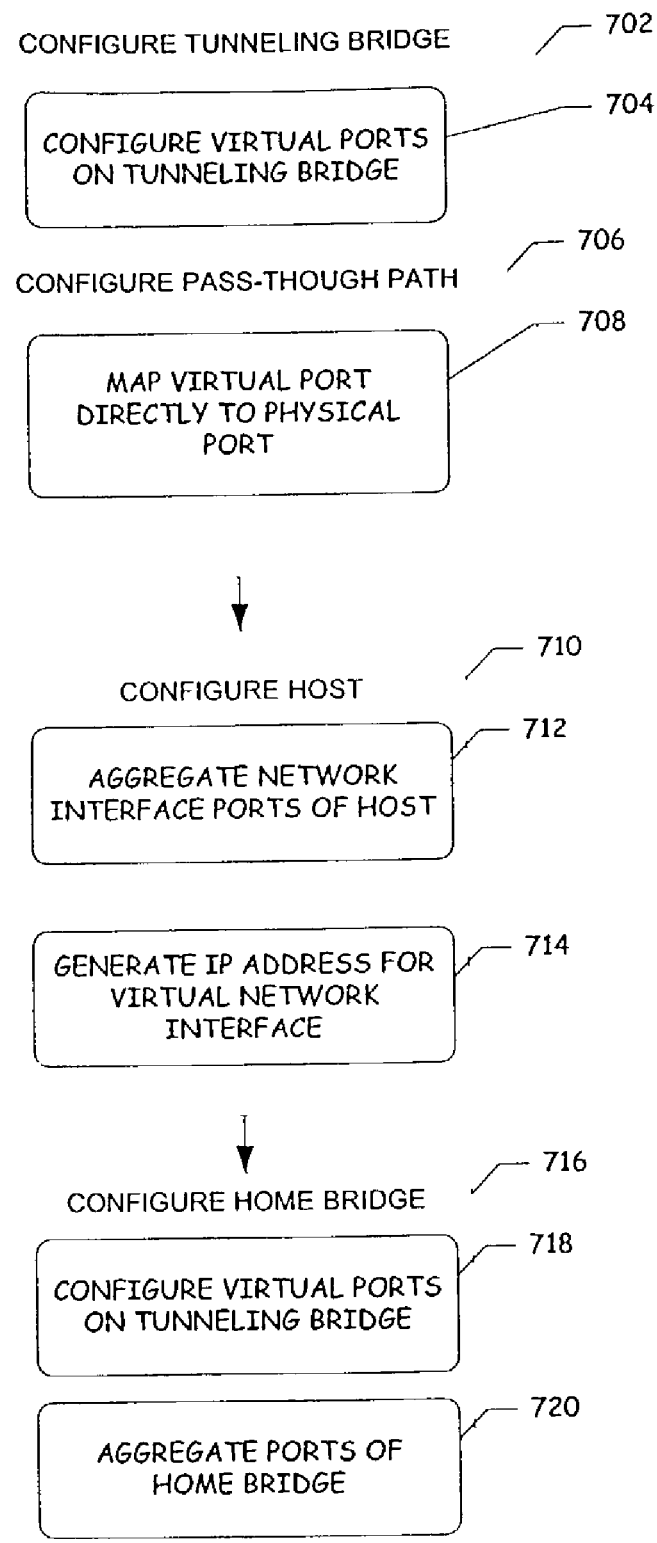
FIGS. 7(A-C) are flow charts illustrating a process of aggregating a plurality of LANs coupling a host to a first and second intermediate network device, according to one embodiment of the present invention.

FIGS. 7(A-C) are flow charts illustrating a process of aggregating a plurality of LANs coupling a host to a first and second intermediate network device, according to one embodiment of the present invention. For clarity of description, the flow charts of FIG. 7 are described with reference to FIGS. 3 and 4.

Initially, a tunneling bridge (e.g., a first intermediate device, bridge 342) is configured (step 702). The tunneling bridge is a bridge which provides a pass-through path. A tunneling bridge may also be a home bridge, which is a bridge that is configured for link aggregation with respect to a given host. To configure the tunneling bridge, the virtual ports (e.g., sub-ports 414) are configured (step 704) and a pass-through path (e.g., pass-through pass 353) is configured (step 706). In configuring the virtual ports, one or more physical ports of the tunneling bridge are mapped to a number of virtual ports. Each virtual port may then be mapped to a number of internal destinations with the tunneling bridge (e.g., bridge forwarding engine 406, aggregated bridge ports 408, or ports 402). To configure the pass-through path, a virtual port is mapped directly to another physical port of the tunneling bridge via a tunnel engine (step 708). For example, referring to FIG. 4 sub-port 4 is mapped directly to port 5 via tunnel engine 410 to provide a pass-through pass from sub-port 4 to port 5. In this configuration, a frame received by sub-port 4 will preferably be immediately transmitted directly to port 5.

A host (e.g., host 356) is configured in step 710. Initially, to configure the host, a number of network interfaces (e.g., S0 and S1) are aggregated (i.e., collectively joined or mapped) to provide a virtual network interface (e.g., network interface 362) (step 712). In one embodiment of the present invention, Link Aggregation is used for the aggregation. Next, an internet protocol (IP) address is generated for the virtual network interface (step 714). With the generated IP address, data addressed to the same IP address may be received on either network interface S0 or S1.

In step 716, the home bridge (e.g. a second intermediate device, bridge 344), is configured (as mentioned above, a home bridge can also serve as a tunneling bridge). To configure the home bridge, the virtual ports (e.g., sub-ports 414) are configured (step 718) and the ports (e.g., ports B0 and bridge-interconnect port 366) are aggregated (step 720). In one embodiment of the present invention, Link Aggregation is used for the aggregation.

As a result of the configuration of the tunneling bridge, Link Aggregation on bridge 344 sees bridge-interconnect port 366 as directly coupled to host 356, even though bridge 342 is coupled between bridge-interconnect port 366 and host 356. Similarly, Link Aggregation on host 356 sees virtual network interface 362 as directly coupled to bridge 344, even though bridge 342 is coupled between virtual network interface 362 and host 356.

FIG. 7B is a flow chart illustrating tunneling a frame from a home bridge (e.g., bridge 344) to a tunneling bridge (e.g., bridge 342), in accordance with one embodiment of the present invention. It is assumed that the destination address of the frame is the IP address corresponding to the virtual network interface of the host. Initially, when a frame is sent from the home bridge to the tunneling bridge, the frame is encapsulated (step 722). In encapsulating a frame, a tag (e.g., tag 506 of FIG. 5) is generated (step 724) and added to the frame (step 732). In the present embodiment, the tag is generated by using a IEEE Std. 802.1Q-1998. The CFI bit is set to 0, the user priority field is set to the priority of the virtual port, and the VLAN-ID field is set to the virtual port number (steps 726, 728, and 730, respectively). Once the tag is encapsulated, it is transmitted to the tunneling bridge (step 734).

The tunneling bridge de-encapsulates the frame (step 736). In de-encapsulating the frame, the virtual port number is determined (step 738) and the frame is received by the virtual port corresponding to the determined virtual port number (step 740). Next, the frame is transmitted directly to the physical port to which the virtual port is mapped (step 742) (e.g., port 5, which is mapped to sub-port 4) and the frame is then transmitted to the host (step 744). FIG. 7C is a flow chart similar to 7B, but from the perspective of transmitting a frame from a host to a home bridge (e.g., bridge 344).

As noted, FIG. 3 depicts a flow diagram illustrating a process according to one embodiment of the present invention. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media optical storage media such as compact disk media (e.g., CD-ROM, CD-R, etc.) and digital video disk storage media nonvolatile memory storage memory including semiconductor-based memory units such as FLASH memory, EEPROM, EPROM, ROM or application specific integrated circuits volatile storage media including registers, buffers or caches, main memory, RAM, and the like and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
aggregating a plurality of LANs, wherein
said aggregating comprises aggregating a first LAN and a second LAN,
said first LAN couples a host to a first intermediate device and said second LAN couples said host to a second intermediate network device, said plurality of LANs comprising said first LAN and said second LAN, and
subsequent to said aggregating, said first LAN and said second LAN are both usable to simultaneously transmit information from said host to said second intermediate network device.

2. The method of claim 1, further comprising:
tunneling said first LAN with a third LAN through said first intermediate network device, said plurality of LANs comprising said third LAN.

3. The method of claim 2, wherein said aggregating comprises:
aggregating a first and a second network interface of said host to provide a virtual network interface, wherein
said first network interface is coupled to said first intermediate network device over said first LAN, and
said second network interface is coupled to said second intermediate network device over said second LAN.

4. The method of claim 3, further comprising:
generating an interne protocol address for said virtual network interface;
transmitting a first frame addressed to said internet protocol address from said second intermediate network device via said first LAN; and
transmitting a second frame addressed to said internet protocol address from said second intermediate network device via said second LAN.

5. The method of claim 4, further comprising:
transmitting said first and said second frame simultaneously.

6. The method of claim 2 wherein said aggregating comprises:
aggregating a first and a second port of said second intermediate network device, wherein
said first port is coupled to said first intermediate network device over said third LAN, and
said second port is coupled to said host over said second LAN.

7. The method of claim 2, wherein said tunneling comprises:
configuring a pass-through path on said first intermediate network device.

8. The method of claim 7, wherein said tunneling further comprises:
coupling a first port of said first intermediate network device to a second port of said first intermediate network device.

9. The method of claim 8, wherein said tunneling further comprises:
transmitting a frame directly from said first port of said first intermediate network device to said second port of said intermediate network device.

10. The method of claim 7, further comprising:
configuring a plurality of virtual ports on said first intermediate network device; and
mapping a virtual port of said plurality directly to a physical port of said first intermediate network device.

11. The method of claim 10, wherein said tunneling comprises:
encapsulating a frame with a virtual port number;
transmitting said frame to said first intermediate network device;
de-encapsulating said frame to determine said virtual port number; and
directly transmitting said frame from said virtual port to said physical port.

12. A computer program product, said computer program product comprising:
a non-transitory computer readable media, wherein the non-transitory computer readable medium stores a first set of instructions, executable on an intermediate network device, configured to aggregate a plurality of LANs, wherein said first set of instructions is configured to aggregate a first LAN and a second LAN,
said first LAN couples a host to a first intermediate device and said second LAN couples said host to a second intermediate network device, said plurality of LANs comprising said first LAN and said second LAN, and
subsequent to said aggregating, said first LAN and said second LAN are both usable to simultaneously transmit information from said host to said second intermediate network device.

13. The computer program product of claim 12, further comprising:
a second set of instructions, executable on said intermediate network device, configured to tunnel a first LAN with a third LAN through said first intermediate network device, said plurality of LANs comprising said third LAN.

14. The computer program product of claim 13, wherein said first set of instructions comprises:
a first sub-set of instructions, executable on said intermediate network device, configured to aggregate a first and a second network interface of said host to provide a virtual network interface, wherein
said first network interface is coupled to said first intermediate network device over said first LAN, and
said second network interface is coupled to said second intermediate network device over said second LAN.

15. The computer program product of claim 14, further comprising:
a third set of instructions, executable on said intermediate network device, configured to generate an internet protocol address for said virtual network interface;
a fourth set of instructions, executable on said intermediate network device, configured to transmit a first frame addressed to said internet protocol address from said second intermediate network device via said first LAN; and
a fifth set of instructions, executable on said intermediate network device, configured to transmit a second frame addressed to said internet protocol address from said second intermediate network device via said second LAN.

16. The computer program product of claim 15, further comprising:
a sixth set of instructions, executable on said intermediate network device, configured to transmit said first and said second frame simultaneously.

17. The computer program product of claim 13, wherein said first set of instructions comprises:
a first sub-set of instructions, executable on said intermediate network device, configured to aggregate a first and a second port of said second intermediate network device, wherein
said first port is coupled to said first intermediate network device over said third LAN, and
said second port is coupled to said host over said second LAN.

18. The computer program product of claim 13, wherein said second set of instructions comprises:
a first sub-set of instructions, executable on said intermediate network device, configured to provide a pass-through path on said first intermediate network device.

19. The computer program product of claim 18, wherein said second set of instructions further comprises:
a second sub-set of instructions, executable on said intermediate network device, configured to couple a first port of said first intermediate network device to a second port of said first intermediate network device.

20. The computer program product of claim 19, wherein said second set of instructions further comprises:
a third sub-set of instructions, executable on said intermediate network device, configured to transmit a frame directly from said first port of said first intermediate network device to said second port of said intermediate network device.

21. The computer program product of claim 18, further comprising:
a third set of instructions, executable on said intermediate network device, configured to configure a plurality of virtual ports on said first intermediate network device; and
a fourth set of instructions, executable on said intermediate network device, configured to map a virtual port of said plurality directly to a physical port of said first intermediate network device.

22. The computer program product of claim 21, wherein said second set of instructions comprises:
a first sub-set of instructions, executable on said intermediate network device, configured to encapsulate a frame with a virtual port number;
a second sub-set of instructions, executable on said intermediate network device, configured to transmit said frame to said first intermediate network device;
a third sub-set of instructions, executable on said intermediate network device, configured to de-encapsulate said frame to determine said virtual port number; and
a fourth sub-set of instructions, executable on said intermediate network device, configured to directly transmit said frame from said virtual port to said physical port.

23. A system comprising:
means for aggregating a plurality of LANs; and
means for tunneling a first LAN with a second LAN through said first intermediate network device, said plurality of LANs comprising said first and said second LAN, wherein
said aggregating comprises aggregating said first LAN and a third LAN,
said first LAN couples a host to a first intermediate device and said third LAN couples said host to a second intermediate network device, and
subsequent to said aggregating, said first LAN and said second LAN are both usable to simultaneously transmit information from said host to said second intermediate network device.

24. The system of claim 23, wherein said aggregating comprises:
aggregating a first and a second network interface of said host to provide a virtual network interface, wherein
said first network interface is coupled to said first intermediate network device over said first LAN, and
said second network interface is coupled to said second intermediate network device over said third LAN.

25. The system of claim 24, further comprising:
means for generating an internet protocol address for said virtual network interface;
means for transmitting a first frame addressed to said internet protocol address from said second intermediate network device via said first LAN; and
means for transmitting a second frame addressed to said internet protocol address from said second intermediate network device via said third LAN.

26. The system of claim 25, further comprising:
means for transmitting said first and said second frame simultaneously.

27. The system of claim 23, wherein said aggregating comprises:
means for aggregating a first and a second port of said second intermediate network device, wherein
said first port is coupled to said first intermediate network device over said second LAN, and
said second port is coupled to said host over said third LAN.

28. The system of claim 23, wherein said tunneling comprises:
means for configuring a pass-through path on said first intermediate network device.

29. The system of claim 28, wherein said tunneling further comprises:
means for coupling a first port of said first intermediate network device to a second port of said first intermediate network device.

30. The system of claim 29, wherein said tunneling further comprises:
means for transmitting a frame directly from said first port of said first intermediate network device to said second port of said intermediate network device.

31. The system of claim 30, further comprising:
means for configuring a plurality of virtual ports on said first intermediate network device; and
means for mapping a virtual port of said plurality directly to a physical port of said first intermediate network device.

32. The system of claim 31, wherein said tunneling comprises:
means for encapsulating a frame with a virtual port number;
means for transmitting said frame to said first intermediate network device;
means for de-encapsulating said frame to determine said virtual port number; and
means for directly transmitting said frame from said virtual port to said physical port.

* * * * *